(12) United States Patent
Lembcke

(10) Patent No.: US 7,810,560 B2
(45) Date of Patent: Oct. 12, 2010

(54) EXPANSION JOINT WITH COMMUNICATION MEDIUM BYPASS

(75) Inventor: Jeffry J. Lembcke, Cypress, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 81 days.

(21) Appl. No.: 12/258,780

(22) Filed: Oct. 27, 2008

(65) Prior Publication Data

US 2010/0101778 A1 Apr. 29, 2010

(51) Int. Cl.
*E21B 17/02* (2006.01)
(52) U.S. Cl. ............. 166/242.7; 166/242.6; 285/123.17
(58) Field of Classification Search ............. 166/242.6, 166/242.7; 285/123.17
See application file for complete search history.

(56) References Cited

U.S. PATENT DOCUMENTS

| 916,136 | A | * | 3/1909 | Ford ..................... 285/123.17 |
| 3,747,961 | A | * | 7/1973 | Couch et al. ............ 285/123.17 |
| 3,884,512 | A | * | 5/1975 | Wesch ................... 285/123.17 |
| 4,278,277 | A | * | 7/1981 | Krijgsman .................. 285/93 |
| 4,385,668 | A | * | 5/1983 | Becker et al. .............. 175/135 |
| 4,445,332 | A | * | 5/1984 | Thies et al. ................ 60/455 |
| 4,576,404 | A | | 3/1986 | Weber |
| 4,984,827 | A | * | 1/1991 | Peppel et al. ......... 285/123.17 |
| 5,054,523 | A | * | 10/1991 | Rink ......................... 137/377 |
| 5,226,495 | A | * | 7/1993 | Jennings, Jr. ............... 166/278 |
| 5,351,727 | A | * | 10/1994 | Sanders et al. .............. 141/59 |
| 6,634,676 | B1 | * | 10/2003 | Lampson et al. ........ 285/123.15 |
| 7,445,248 | B2 | * | 11/2008 | Thaler et al. ................. 285/47 |
| 2003/0221829 | A1 | | 12/2003 | Patel et al. |
| 2007/0074872 | A1 | | 4/2007 | Due et al. |
| 2009/0032268 | A1 | | 2/2009 | Blanton et al. |
| 2009/0078430 | A1 | | 3/2009 | Due |

FOREIGN PATENT DOCUMENTS

GB 2 415 834 4/2006

OTHER PUBLICATIONS

European Search Report received in corresponding European application No. 09013341.4-2424 dated Feb. 18, 2010.

* cited by examiner

*Primary Examiner*—Shane Bomar
*Assistant Examiner*—Sonya Bible
(74) *Attorney, Agent, or Firm*—Wong, Cabello, Lutsch, Rutherford & Brucculeri, L.L.P.

(57) ABSTRACT

An expansion joint with one or more communication medium bypass paths is described herein. At least some illustrative embodiments include a first axially flexible cylinder, one or more additional axially flexible cylinders positioned within the first cylinder, and first and second annular members each positioned at a opposite ends of, and each coupled to, the first cylinder and the one or more additional cylinders (the first and second annular members each including one or more apertures through each member). All cylinders concurrently extend and contract in axial length when the first and second annular members are respectively moved away from and towards each other. Annular spaces formed by each of the one or more additional cylinders and an externally adjacent cylinder, together with corresponding apertures of each of the first and second annular members, each provides at least one path for at least one communication medium.

28 Claims, 6 Drawing Sheets

EXPANSION JOINT WITH COMMUNICATION MEDIUM BYPASS

BACKGROUND

As the worldwide demand for oil and gas has continued to escalate, the systems used to control and monitor the production of oil and gas wells have continued to increase in sophistication and complexity. It is not uncommon for wells to have a significant number of production zones, and to incorporate multiple sets of monitoring and control systems, each requiring separate sets of communication and control lines between the surface and the downhole equipment located within each production zone. Such communication and control lines may include hydraulic lines, copper electrical lines, and optical fiber lines, just to name a few examples. While techniques do exist for attaching multiple lines to production tubing as they are introduced into the well during the well completion process, the use of expansion joints along the length of the production tubing may limit or even preclude the use of multiple lines.

Expansion joints are necessary in extreme environments that subject the production tubing to significant expansion and compression forces such as those found, for example, in offshore wells or in deep wells where the production tubing can be subjected to large variations in temperature both in the surrounding strata and in the product being extracted through the tubing. These temperature variations over very large lengths of production tubing can produce significant variations in tubing length, thus necessitating the use of expansion joints over the length of the production tubing to relieve the stresses created and to avoid damaging the tubing and any production equipment coupled to the tubing.

Existing systems using a single control/communication line, such as a ¼" hydraulic control line attached to the outside of the production tubing from the surface to the downhole equipment being controlled (e.g., a downhole safety valve), are sometimes configured to account for the variations in tubing length at the expansion joint by coiling the control line around the joint, thus allowing the line to coil and uncoil as the joint correspondingly contracts and extends. While it is possible to incorporate such line coils around expansion joints when using a single control/communication line, such coiling may not work with systems that require even as few as two or three lines. This is due to the fact that over time, as the joint contracts and extends, the control/communication lines will tend to become entangled, which over time can damage the lines. If the lines are damaged, it may become necessary to shut the well down and set up a "workover" rig to remove the production tubing and replace the damaged lines. Such repairs are extremely expensive, both in terms of the direct costs of performing the repairs, as well as in terms of lost production due to the significant amount of time it takes to perform the repairs.

SUMMARY

An expansion joint with one or more communication medium bypass paths is described herein. At least some illustrative embodiments include a first axially flexible cylinder, one or more additional axially flexible cylinders positioned within the first cylinder, a first annular member positioned at a first end of, and coupled to, the first cylinder and the one or more additional cylinders (the first annular member including one or more apertures through said member), and a second annular member positioned at a second opposite end of, and coupled to, the first cylinder and the one or more additional cylinders (the second annular member including one or more apertures through said member). All cylinders concurrently extend and contract in axial length when the first and second annular members are respectively moved away from and towards each other. Annular spaces formed by each of the one or more additional cylinders and an externally adjacent cylinder, together with corresponding apertures of each of the first and second annular members, each provides at least one path for at least one communication medium.

At least some other illustrative embodiments include a downhole production tubing system that includes a plurality of tubing segments coupled to each other to provide at least part of a path between one or more production zones within a well and the surface above the well, and an expansion joint that couples at least two of the plurality of tubing segments together. The expansion joint includes a first axially flexible cylinder, one or more additional axially flexible cylinders located within the first cylinder, a first annular member positioned at a first end of, and coupled to, the first cylinder and the one or more additional cylinders (the first annular member including one or more apertures through said member), and a second annular member positioned at a second opposite end of, and coupled to, the first cylinder and the one or more additional cylinders (the second annular member including one or more apertures through said member). All cylinders concurrently extend and contract in axial length when the first and second annular members respectively move away from and towards each other in response to expansions and contractions of at least one of the tubing segments. Annular spaces formed by each of the one or more additional cylinders and an externally adjacent cylinder, together with corresponding apertures of each of the first and second annular members, each provides at least one path for at least one communication medium used for communication between surface equipment and downhole equipment.

Other illustrative embodiments of an expansion joint include means for flexibly encapsulating at least one communication medium (the means for encapsulating extending and contracting in a longitudinal direction) and means for securing each of two ends of the means for encapsulating (each end opposed to the other along the longitudinal direction, and each means for securing including at least one means for traversing the corresponding means for securing). Each of the means for securing moves away and towards each other as the means for encapsulating respectively extends and contracts. The means for encapsulating, in conjunction with the at least one means for traversing of each of the means for securing, provides a path through the expansion joint for the at least one communication medium.

Still other illustrative embodiments of a downhole production tubing system include a plurality of tubing segments coupled to each other to provide at least part of a path between one or more production zones within a well and the surface above the well, and an expansion joint that couples at least two of the plurality of tubing segments together. The expansion joint includes means for flexibly encapsulating at least one communication medium (the means for encapsulating extending and contracting in a longitudinal direction), and means for securing each of two ends of the means for encapsulating (each end opposed to the other along the longitudinal direction, and each means for securing including at least one means for traversing the corresponding means for securing). Each of the means for securing moves away and towards each other as the means for encapsulating respectively extends and contracts in response to expansions and contractions of at least one of the tubing segments. The means for encapsulating, in conjunction with the at least one means for traversing of each of the means for securing, provides a path through the expansion joint for the at least one communication medium used for communication between surface equipment and downhole equipment.

BRIEF DESCRIPTION OF THE DRAWINGS

For a detailed description of at least some illustrative embodiments, reference will now be made to the accompanying drawings in which.

DETAILED DESCRIPTION

Figure 1:
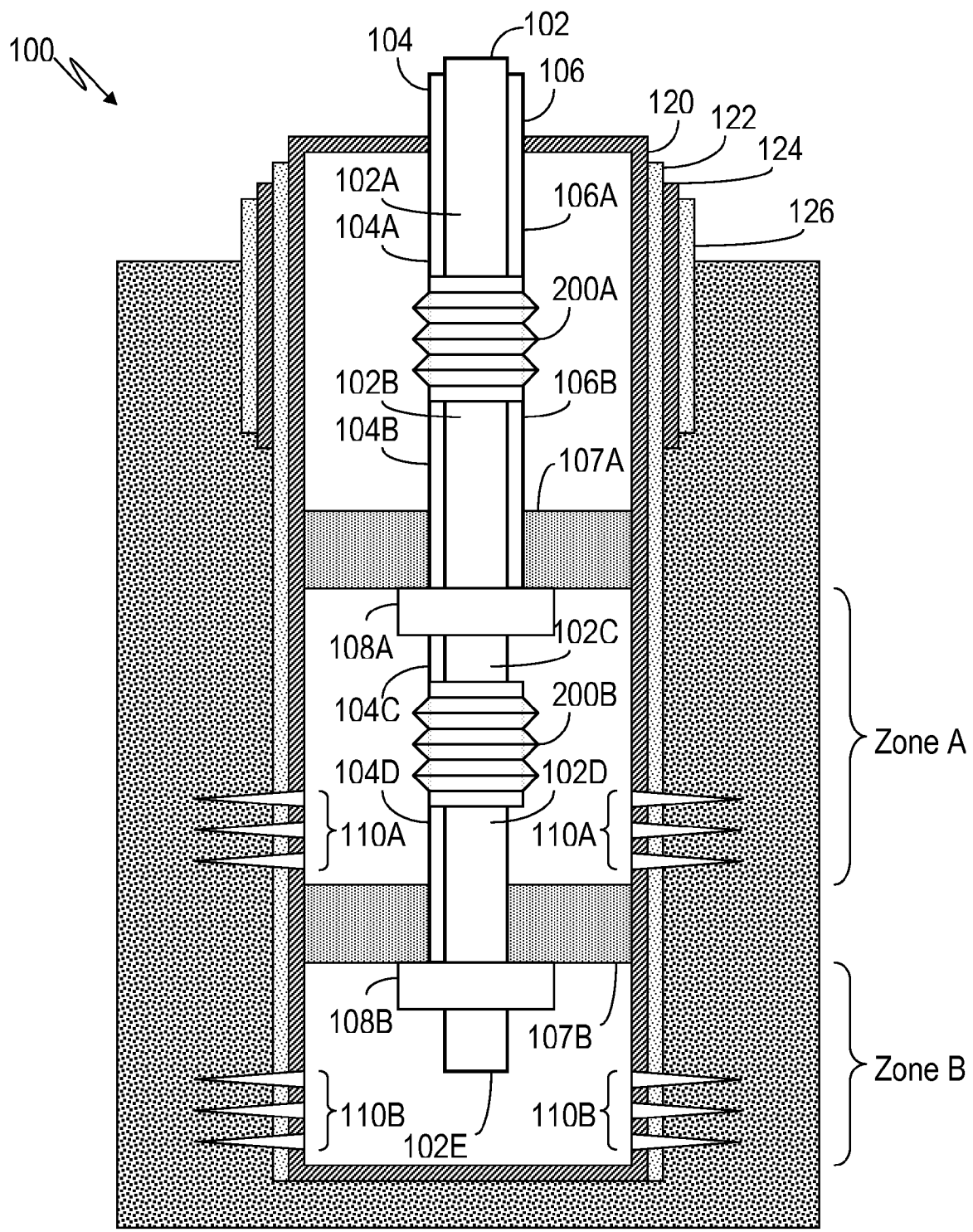
FIG. 1 shows a simplified diagram of a production well that incorporates several expansion joints along the production tubing, in accordance with at least some illustrative embodiments.

FIG. 1 shows a simplified completed production well 100 using a production tubing 102 that includes tubing segments 102A, 102B, 102C, 102D and 102E, and expansion joints 200A and 200B constructed in accordance with at least some illustrative embodiments. The well includes surface casing 124, secured in place by cement 126, and production casing 120, concentrically located within surface casing 124 and secured in place by cement 122. Production tubing 102 runs the length of production well 100, from the surface through production zones A and B. Packers 107A and 107B are secured to both the inside of production casing 120 and the outside of production tubing 102, and serve to isolate each production zone. Chokes 108A and 108B operate to control the flow of product originating from the perforations within each production zone (perforations 110A within zone A, and perforations 110B within zone B, respectively) through production tubing 102. In the example of FIG. 1, choke 108A is hydraulically controlled via hydraulic control line 106, and choke 108B is similarly hydraulically controlled via hydraulic control line 104.

Because production tubing 102 is secured at the top of production casing 120 and at each of packers 107A and 107B, expansion and/or contraction of the production tubing (e.g., due to thermal variations along the length of the tubing) can produce significant stress forces on the production tubing and the control lines. To help alleviate such stress forces, expansion joints 200A and 200B are inserted along the length of production tubing 102. Expansion joint 200A is inserted between tubing segments 102A and 102B, and operates to alleviate the stress forces that may develop along production tubing 102 and control lines 104 and 106 between the top of production casing 120 and packer 107A. Similarly, expansion joint 200B is inserted between tubing segments 102C and 102D to alleviate the stress forces that develop along production tubing 102 and control line 104 between packer 107A and 107B.

As is evident from FIG. 1, the hydraulic fluid within hydraulic control line 104 passes through both expansion joints 200A and 200B. Likewise, hydraulic fluid within hydraulic control line 106 passes through expansion joint 200A. In at least some embodiments, these control lines are constructed of ¼" metal tubing and are secured to the exterior of production tubing 102. Control line segments 104A, 104B, 106A and 106B each couple to expansion joint 200A, while control line segments 104C and 104D couple to expansion joint 200B. Each expansion joint shown provides a separate, isolated path for the fluid of each control line to which it is coupled, as is described in more detail below.

Figure 2A:
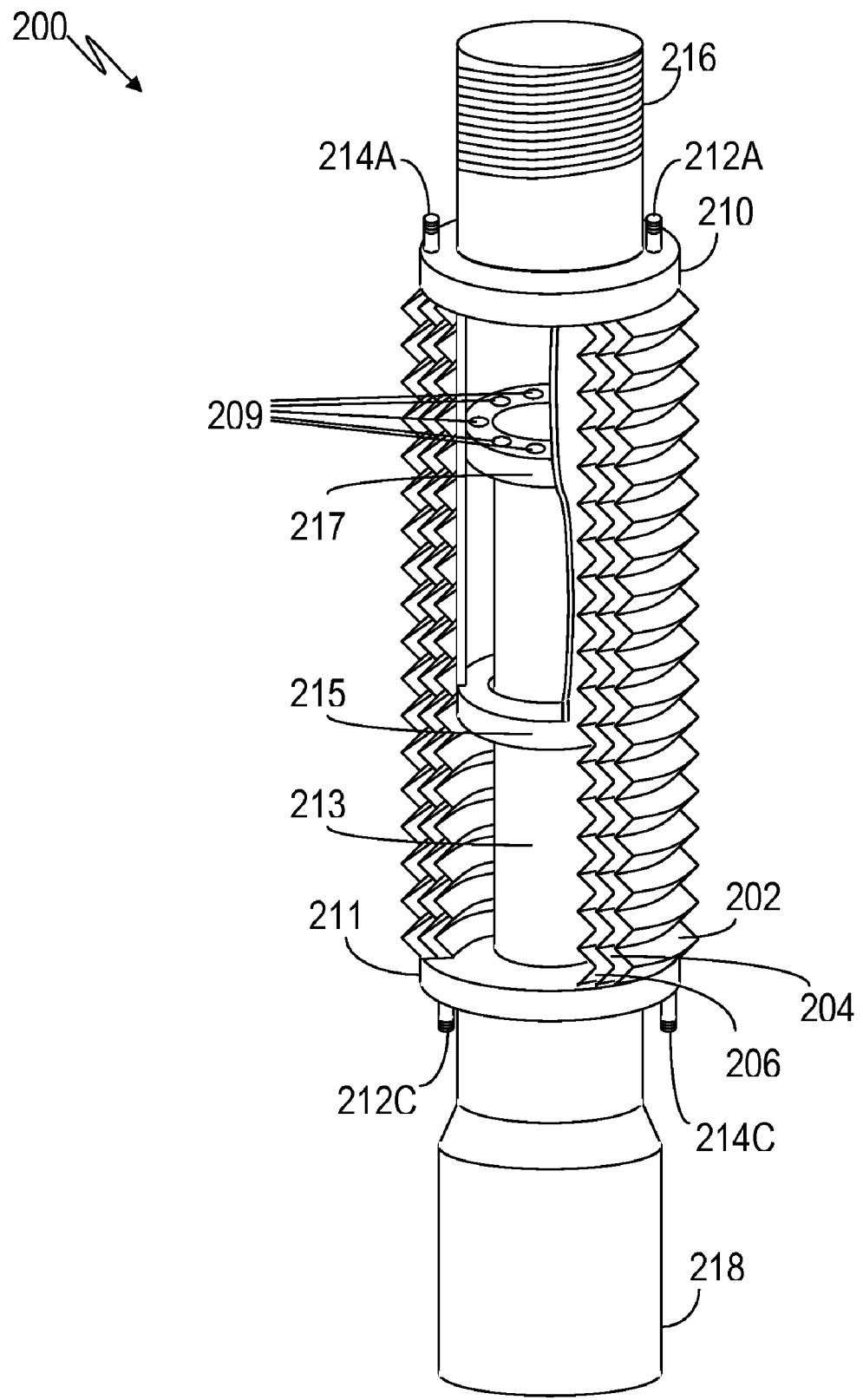
FIG. 2A shows a detailed view of the expansion joint of FIG. 1, in accordance with at least some illustrative embodiments.
Figure 2B:
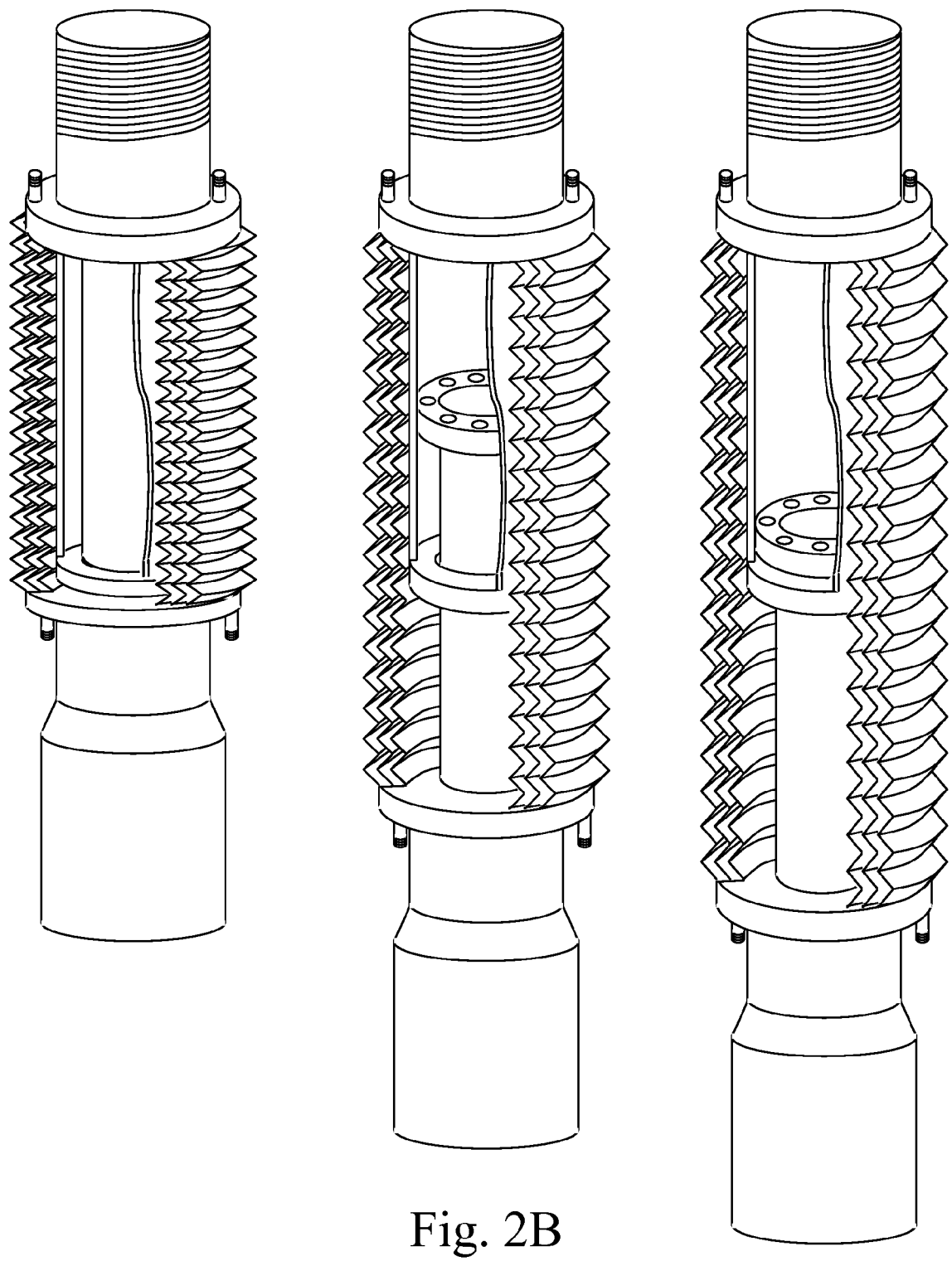
FIG. 2B shows the expansion joint of FIG. 1 in various states ranging from fully contracted to fully extended, in accordance with at least some illustrative embodiments.

FIG. 2A illustrates a detailed, cutaway view of an expansion joint 200, constructed in accordance with at least some illustrative embodiments. Joint 200 includes a telescoping tubular assembly that includes tubular members 213 and 215. Tubular member 213 has a smaller diameter than tubular member 215, is concentrically located within tubular member 215, and is able to move along the central axis of expansion joint 200. Tubular member 213 includes annular members 211 and 217, and annular member 217 includes apertures 209 through the annular member to permit fluid flow from one side of the annular member to the other as tubular member 213 moves within tubular member 215. The travel of tubular member 213 is limited by annular member 217 when expansion joint 200 is fully extended and by annular member 211 when expansion joint 200 is fully contracted. When expansion joint 200 is either fully contracted or fully extended, the forces exerted on the expansion joint (either compressive or tensional) are transferred along tubular members 213 and 215. FIG. 2B illustrates expansion joint 200 while fully contracted, partially extended and fully extended.

Continuing to refer to FIG. 2A, tubular member 215 includes annular member 210 and threaded end 216, and tubular member 213 further includes threaded collar 218 (threads not shown). Threaded end 216 and threaded collar 218 enable expansion joint 200 to be coupled to tubing segments as shown in FIG. 1. Each of annular members 210 and 211 of FIG. 2A radially extend beyond the outer diameter of tubular member 215, allowing each of flexible hollow cylinders 202, 204 and 206 to be positioned outside of tubular member 215 and attached to both annular members 210 and 211. In the example of FIG. 2A, the flexible cylinders are implemented using bellowed walls. Such bellows may be manufactured using any of a number of techniques (e.g., welding together individual rings). Further, the flexible cylinders may also be implemented using structures other than bellows, and using flexible geometric shapes other than a flexible cylinder.

Each pair of adjacent flexible cylinders, together with annular members 210 and 211, form annular spaces between the cylinders and annular members. In at least some illustrative embodiments, the cylinders are each hermetically coupled to the annular members (e.g., using continuous welds around the entire circumference of the joints between the cylinder ends and the annular members). In such embodiments, the resulting annular space is used to transfer fluids, such as the hydraulic fluid passing through control lines 104 and 106 of FIG. 1. The transfer of fluids to these annular spaces is accomplished by including apertures within each of annular members 210 and 211 that pass through each member and are aligned with the annular spaces between the flexible cylinders. In the example of FIG. 2A, these apertures (212A, 212C, 214A and 214C) are extended using threaded tubing attached to the annular members (e.g., ¼" tubing similar to that used for control lines 104 and 106 of FIG. 1).

Figure 3:
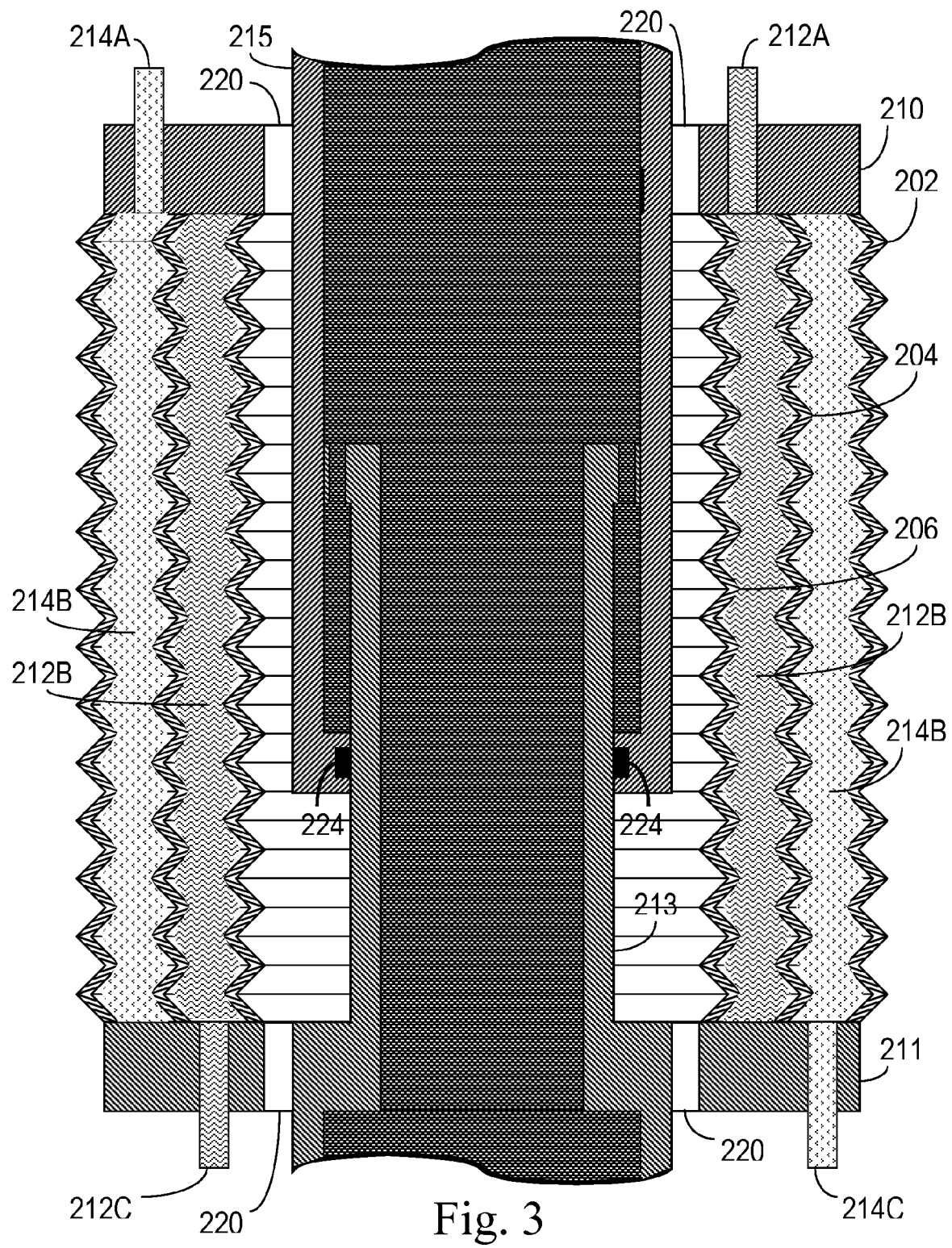
FIG. 3 shows a cross-sectional view of the expansion joint of FIG. 1 incorporating two hydraulic paths through the joint, in accordance with at least some illustrative embodiments.

FIG. 3 illustrates a cross-sectional view of the expansion joint of FIG. 1, constructed in accordance with at least some illustrative embodiments. The illustrated expansion joint includes two separate fluid paths that are kept isolated from each other. The first path flows through aperture 214A in annular member 210, annular space 214B between flexible cylinders 202 and 204, and aperture 214C in annular member 211. The second path flows through aperture 212A in annular member 210, annular space 212B between flexible cylinders 204 and 206, and aperture 212C in annular member 211. In at least some illustrative embodiments, the apertures associated with a given flow in each of the annular members are radially located on opposite sides of the cylinder to evenly distribute the fluid flow throughout the annular space. Other positions for, and numbers of, such apertures may also be suitable to implement the claimed expansion joint.

As can be seen from FIGS. 2B and 3, as the expansion joint extends and contracts, the bellows of the cylinders respectively move radially inwardly and outwardly. This movement, together with the overall radial flexibility of the cylinder walls and the large volume of the annular space relative to the diameter of the control lines, allows the volume of the annular space to remain relatively constant and produces little if any pressure variations in the fluid within the control lines coupled to the expansion joint as the joint extends and contracts. Further, because such movements within the production tubing are gradual over time, any pressure variations that do occur can be compensated using a variety of known pressure control systems and methods.

Also, as the expansion joint extends and contracts, and tubular member 213 extends beyond or contracts into tubular member 215, it is important to maintain the pressure integrity of the telescoping tubular assembly. In at least some illustrative embodiments, at least one seal 224 is located within a groove at the end of tubular member 215 nearest to annular member 211 and around the exterior of tubular member 213 where it protrudes out from tubular member 215, as shown in FIG. 3 (as well as FIGS. 4 and 5). Such a seal operates to contain the fluid passing through the expansion joint to the interior of tubular members 213 and 215, and prevents the loss of pressure and fluid as the expansion joint extends and contracts.

Figure 4:
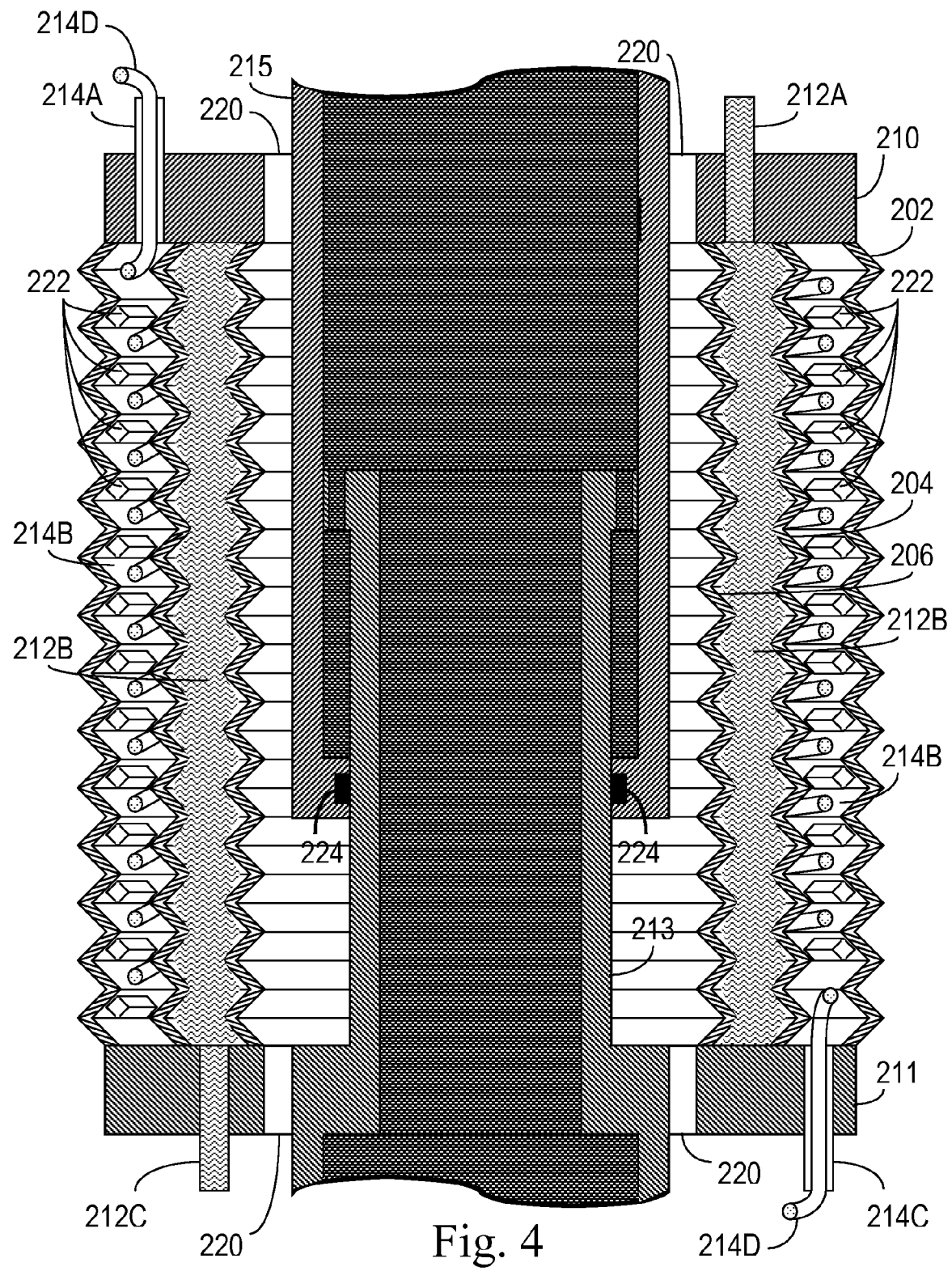
FIG. 4 shows a cross-sectional view of the expansion joint of FIG. 1, incorporating both a hydraulic path and an optical fiber path through the joint, in accordance with at least some illustrative embodiments.

Although the embodiments described above illustrate the transfer of hydraulic fluid through the expansion joints, other communication media may also be routed through the expansion joint. For example, FIG. 4 illustrates a cross-sectional view of an expansion joint that allows both hydraulic fluid and an optical fiber to be routed through the same joint, in accordance with at least some illustrative embodiments. In a manner similar to the example of FIG. 3, hydraulic fluid in the example of FIG. 4 is routed through apertures 212A and 212C, as well as annular space 212B. But an optical fiber 214D is routed through aperture 214A, annular space 214B and aperture 214C in the example of FIG. 4, rather than hydraulic fluid. Optical fiber 214D is coiled within annular space 214B so as to allow the fiber to adjust to the changes in the length of the expansion joint without substantially stressing the fiber with tensional forces as the joint extends, and to avoid exceeding the bend radius of the fiber as the joint contracts. In at least some illustrative embodiments of the expansion joint of FIG. 4 optical fiber 214D is routed outside the expansion joint within a protective tubing (e.g., ¼" tubing similar to that used for control lines 104 and 106 of FIG. 1, but not shown in FIG. 4) which runs along the outside of production tubing 102 as shown in FIG. 1 and protects the optical fiber from the extreme conditions present in the downhole environment In at least some illustrative embodiments, spacers are positioned between the cylinder walls within the annular space to prevent the walls from crushing a communication medium routed through the annular space. In the example of FIG. 4, spacers 222 are attached to the inside of flexible cylinder 202 such that as the expansion joint contracts, and portions of the bellowed wall of cylinder 202 move closer to portions of the bellowed wall of cylinder 204, the walls are kept at a minimum distance (i.e., approximately the thickness of spacer 222, accounting for some possible compression of the spacer), which protects the fiber from either being crushed or flexed beyond its bend radius. While small rectangular spacers are shown in FIG. 4, any number of spacers of different sizes and shapes may be suitable for use in at least some illustrative embodiments. Such spacers may also be used within an annular space used to route a fluid (e.g., annular space 212B) so as to further limit changes in the overall volume of the annular space as the expansion joint extends and contracts.

Additionally, while the example of FIG. 4 shows two annular spaces, one routing a hydraulic fluid and the other routing an optical fiber, any number of annular spaces (limited only by the physical space limitations imposed by the dimensions of a given expansion joint), any number and combination of different types of communication media, and any type of communication media may be suitable for use in at least some illustrative embodiments. Such communication media include, but are not limited to, fluids, optical media, electrical conductors, radio frequency waveguides, acoustical media, and ultrasonic media, just to name a few examples.

Figure 5:
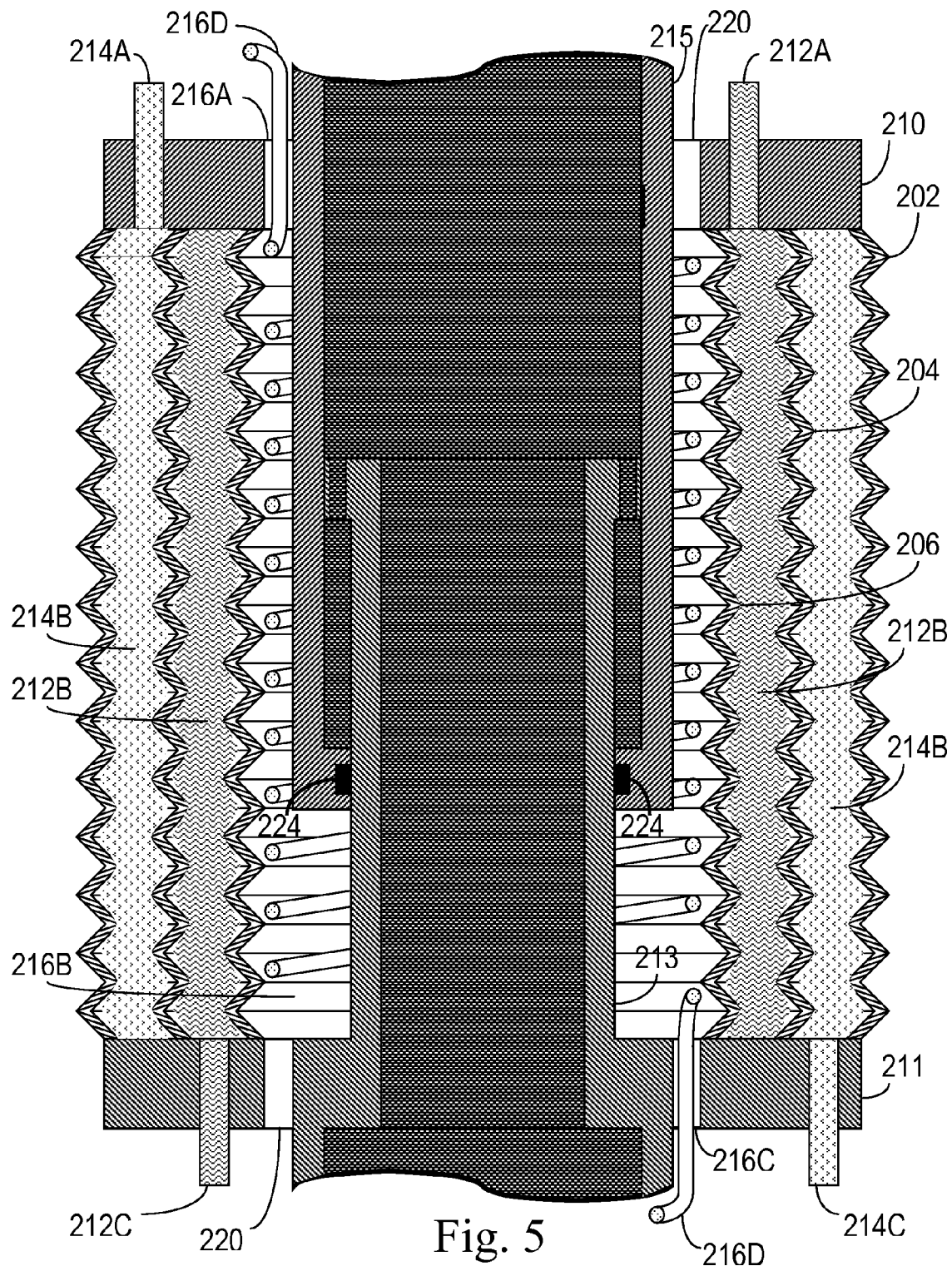
FIG. 5 shows a cross-section view of the expansion joint of FIG. 1, incorporating two hydraulic paths and a third optical fiber path through the joint, in accordance with at least some illustrative embodiments.

In another illustrative embodiment shown in FIG. 5, the two annular spaces 212B and 214B both provide fluid paths through the expansion joint. Optical fiber 216D provides a third communication medium and is routed through the expansion joint via aperture 216A, annular space 216B (between the innermost flexible cylinder and the telescoping tubular assembly) and aperture 214C. As in the example of FIG. 3, optical fiber 216D of FIG. 5 is coiled within annular space 216B so as to allow the fiber to adjust to the changes in the length of the expansion joint without substantially stressing the fiber with tensional forces as the joint extends, and to avoid exceeding the bend radius of the fiber as the joint contracts. In a manner similar to the example of FIG. 4, in at least some illustrative embodiments of the expansion joint of FIG. 5 optical fiber 214D is routed outside the expansion joint within a protective tubing (e.g., ¼" tubing similar to that used for control lines 104 and 106 of FIG. 1, but not shown in FIG. 5) which runs along the outside of production tubing 102 as shown in FIG. 1.

To avoid subjecting the flexible cylinder walls to additional stresses caused by pressure differences between the region external to the expansion joint and the region between the innermost flexible cylinder and the telescoping tubing, at least some illustrative embodiments include any of a number of pressure equalization apertures through either or both annular rings 210 and 211 to allow fluid flow between the exterior of the expansion joint and the interior of the innermost cylinder (but external to the tubing). These are shown as apertures 220 in FIGS. 3, 4 and 5. While shown as straight, cylindrical apertures, various other shapes and routings may also be suitable to form the apertures. Also, while four such apertures are shown relatively positioned at opposite sides of annular rings 210 and 211 in FIGS. 3 and 4 (and two apertures in FIG. 5), any number of apertures in any of a variety of relative positions may be suitable implementations of the apertures 220.

The above discussion is meant to illustrate the principles and at least some embodiments. Other variations and modifications will become apparent to those of ordinary skill in the art once the above disclosure is fully appreciated. For example, while some of the embodiments describe the use of communication media to operate chokes positioned along a production tubing within a well, the communication media may be used for any type of information exchange between any type of equipment, in any direction, both inside and outside the well. Further, such exchanged information may be used for controlling downhole equipment from the surface, for reporting status and/or data from downhole equipment to the surface, or for exchanging information between multiple pieces of downhole equipment located at different points along the length of the well. It is intended that the following claims be interpreted to include all such variations and modifications.

What is claimed is:

1. An expansion joint, comprising:
   a first axially flexible cylinder;
   one or more additional axially flexible cylinders positioned within the first cylinder;
   a first annular member positioned at a first end of, and coupled to, the first cylinder and the one or more additional cylinders, the first annular member comprising one or more apertures through said member; and
   a second annular member positioned at a second opposite end of, and coupled to, the first cylinder and the one or more additional cylinders, the second annular member comprising one or more apertures through said member;
   wherein all cylinders concurrently extend and contract in axial length when the first and second annular members are respectively moved away from and towards each other, and each cylinder contracts by folding upon itself and extends by unfolding; and
   wherein annular spaces formed by each of the one or more additional cylinders and an externally adjacent cylinder, together with corresponding apertures of each of the first and second annular members, each provides at least one path for at least one communication medium.

2. The expansion joint of claim 1, wherein the first and second annular members are hermetically coupled to at least two adjacent cylinders.

3. The expansion joint of claim 1, wherein the at least one communication medium comprises at least one medium selected from the group consisting of a hydraulic fluid, an electrical cable and an optical fiber.

4. The expansion joint of claim 1, further comprising:
   a telescoping tubular assembly comprising a plurality of concentric tubular members, said tubular assembly sustaining and transferring substantially all of the tensional and compressive forces exerted through the expansion joint when respectively fully extended and fully contracted;
   wherein an outermost tubular member of the plurality of tubular members comprises the first annular member, and an innermost tubular member of the plurality of tubular members comprises the second annular member; and
   wherein the telescoping tubular assembly axially extends and contracts concurrently with all the cylinders.

5. The expansion joint of claim 4,
   wherein the annular space between the innermost cylinder and the telescoping tubular assembly, together with at least one corresponding additional aperture through each of the first and second annular members, provides at least one additional path for at least one additional communication medium; and
   wherein the at least one additional communication medium comprises at least one medium selected from the group consisting of an electrical cable and an optical fiber.

6. The expansion joint of claim 1, further comprising one or more spacers positioned between facing surfaces of two adjacent cylinders, wherein the spacers maintain a minimum spacing between the two adjacent cylinders.

7. The expansion joint of claim 1, further comprising one or more pressure equalization apertures that each provides a fluid flow path between a first region external to an outermost cylinder and a second region internal to an innermost cylinder.

8. A downhole production tubing system, comprising:
   a plurality of tubing segments coupled to each other to provide at least part of a path between one or more production zones within a well and the surface above the well; and
   an expansion joint that couples at least two of the plurality of tubing segments together, the expansion joint comprising:
   a first axially flexible cylinder;
   one or more additional axially flexible cylinders located within the first cylinder;
   a first annular member positioned at a first end of, and coupled to, the first cylinder and the one or more additional cylinders, the first annular member comprising one or more apertures through said member; and
   a second annular member positioned at a second opposite end of, and coupled to, the first cylinder and the one or more additional cylinders, the second annular member comprising one or more apertures through said member;
   wherein all cylinders concurrently extend and contract in axial length when the first and second annular members respectively move away from and towards each other in response to expansions and contractions of at least one of the tubing segments, and each cylinder contracts by folding upon itself and extends by unfolding; and
   wherein annular spaces formed by each of the one or more additional cylinders and an externally adjacent cylinder, together with corresponding apertures of each of the first and second annular members, each provides at least one path for at least one communication medium used for communication between surface equipment and downhole equipment.

9. The downhole production tubing system of claim 8, wherein the first and second annular members are hermetically coupled to at least two adjacent cylinders.

10. The downhole production tubing system of claim 8, wherein the at least one communication medium comprises at least one medium selected from the group consisting of a hydraulic fluid, an electrical cable and an optical fiber.

11. The downhole production tubing system of claim 8,
    wherein the expansion joint further comprises a telescoping tubular assembly comprising a plurality of concentric tubular members, said tubular assembly sustaining and transferring substantially all of the tensional and compressive forces exerted through the expansion joint when respectively fully extended and fully contracted; and
    wherein an outermost tubular member of the plurality of tubular members comprises the first annular member, an innermost tubular member of the plurality of tubular members comprises the second annular member, and the telescoping tubular assembly axially extends and contracts concurrently with all the cylinders.

12. The downhole production tubing system of claim 11, wherein the annular space between the innermost cylinder and the telescoping tubular assembly, together with at least one corresponding additional aperture through each of the first and second annular members, provides at least one additional path for at least one additional communication medium; and
wherein the at least one additional communication medium comprises at least one medium selected from the group consisting of an electrical cable and an optical fiber.

13. The downhole production tubing system of claim 8, the expansion joint further comprising one or more spacers positioned between facing surfaces of two adjacent cylinders, wherein the spacers maintain a minimum spacing between the two adjacent cylinders.

14. The downhole production tubing system of claim 8, the expansion joint further comprising one or more pressure equalization apertures that each provides a fluid flow path between a first region external to an outermost cylinder and a second region internal to an innermost cylinder.

15. An expansion joint, comprising:
means for flexibly encapsulating at least one communication medium, the means for encapsulating extending and contracting in a longitudinal direction; and
means for securing each of two ends of the means for encapsulating, each end opposed to the other along the longitudinal direction, and each means for securing comprising at least one means for traversing the corresponding means for securing;
wherein each of the means for securing moves away and towards each other as the means for encapsulating respectively extends and contracts, and the means for encapsulating contracts by folding upon itself and extends by unfolding; and
wherein the means for encapsulating, in conjunction with the at least one means for traversing each of the means for securing, provides a path through the expansion joint for the at least one communication medium.

16. The expansion joint of claim 15, wherein the means for encapsulating encapsulates a plurality of communication media and comprises a means for maintaining separation of two adjacent communication media of said plurality of communication media.

17. The expansion joint of claim 15, wherein each of the means for securing hermetically couples to one of the two ends of the means for encapsulating.

18. The expansion joint of claim 15, wherein the at least one communication medium comprises at least one medium selected from the group consisting of a hydraulic fluid, an electrical cable and an optical fiber.

19. The expansion joint of claim 15, further comprising:
means for flexibly containing and transporting a fluid, and for sustaining and transferring substantially all of the tensional and compressive forces exerted through the expansion joint when respectively fully extended and fully contracted;
wherein the means for containing, transporting and transferring comprises the means for securing both ends of the means for encapsulating; and
wherein the means for containing, transporting and transferring extends and contracts in the longitudinal direction concurrently with the means for encapsulating.

20. The expansion joint of claim 19,
wherein an annular space between the innermost means for encapsulating and the means for containing, transporting and transferring, in conjunction with the at least one additional means for traversing each of the means for securing, provides at least one additional path through the expansion joint for at least one additional communication medium; and
wherein the at least one additional communication medium comprises at least one medium selected from the group consisting of an electrical cable and an optical fiber.

21. The expansion joint of claim 15, further comprising means for equalizing pressures between a first region external to an outermost surface of the means for encapsulating and a second region internal to an innermost surface of the means for encapsulating.

22. A downhole production tubing system, comprising:
a plurality of tubing segments coupled to each other to provide at least part of a path between one or more production zones within a well and the surface above the well; and
an expansion joint that couples at least two of the plurality of tubing segments together, the expansion joint comprising:
means for flexibly encapsulating at least one communication medium, the means for encapsulating extending and contracting in a longitudinal direction; and
means for securing each of two ends of the means for encapsulating, each end opposed to the other along the longitudinal direction, and each means for securing comprising at least one means for traversing the corresponding means for securing;
wherein each of the means for securing moves away and towards each other as the means for encapsulating respectively extends and contracts in response to expansions and contractions of at least one of the tubing segments, and the means for encapsulating contracts by folding upon itself and extends by unfolding; and
wherein the means for encapsulating, in conjunction with the at least one means for traversing each of the means for securing, provides a path through the expansion joint for the at least one communication medium used for communication between surface equipment and downhole equipment.

23. The downhole production tubing system of claim 22, wherein the means for encapsulating further individually encapsulates each of a plurality of communication media.

24. The downhole production tubing system of claim 22, wherein each end of the means for encapsulating hermetically couples to a corresponding means for securing.

25. The downhole production tubing system of claim 22, wherein the at least one communication medium comprises at least one medium selected from the group consisting of a hydraulic fluid, an electrical cable and an optical fiber.

26. The downhole production tubing system of claim 22,
wherein the expansion joint further comprises means for flexibly containing and transporting a fluid, and for sustaining and transferring substantially all of the tensional and compressive forces exerted on the expansion joint when respectively fully extended and fully contracted, said means for containing, transporting and transferring comprising the means for securing both ends of the means for encapsulating; and
wherein the means for containing, transporting and transferring extends and contracts in the longitudinal direction concurrently with the means for encapsulating.

27. The downhole production system of claim 26, wherein an annular space between the innermost means for encapsulating and the means for containing, transporting and transferring, in conjunction with the at least one additional means for traversing each of the means for securing, provides at least one additional path through the expansion joint for at least one additional communication medium; and wherein the at least one additional communication medium comprises at least one medium selected from the group consisting of an electrical cable and an optical fiber.

28. The downhole production tubing system of claim 22, further comprising means for equalizing pressures between a first region external to an outermost surface of the means for encapsulating and a second region internal to an innermost surface of the means for encapsulating.

* * * * *